UNITED STATES PATENT OFFICE.

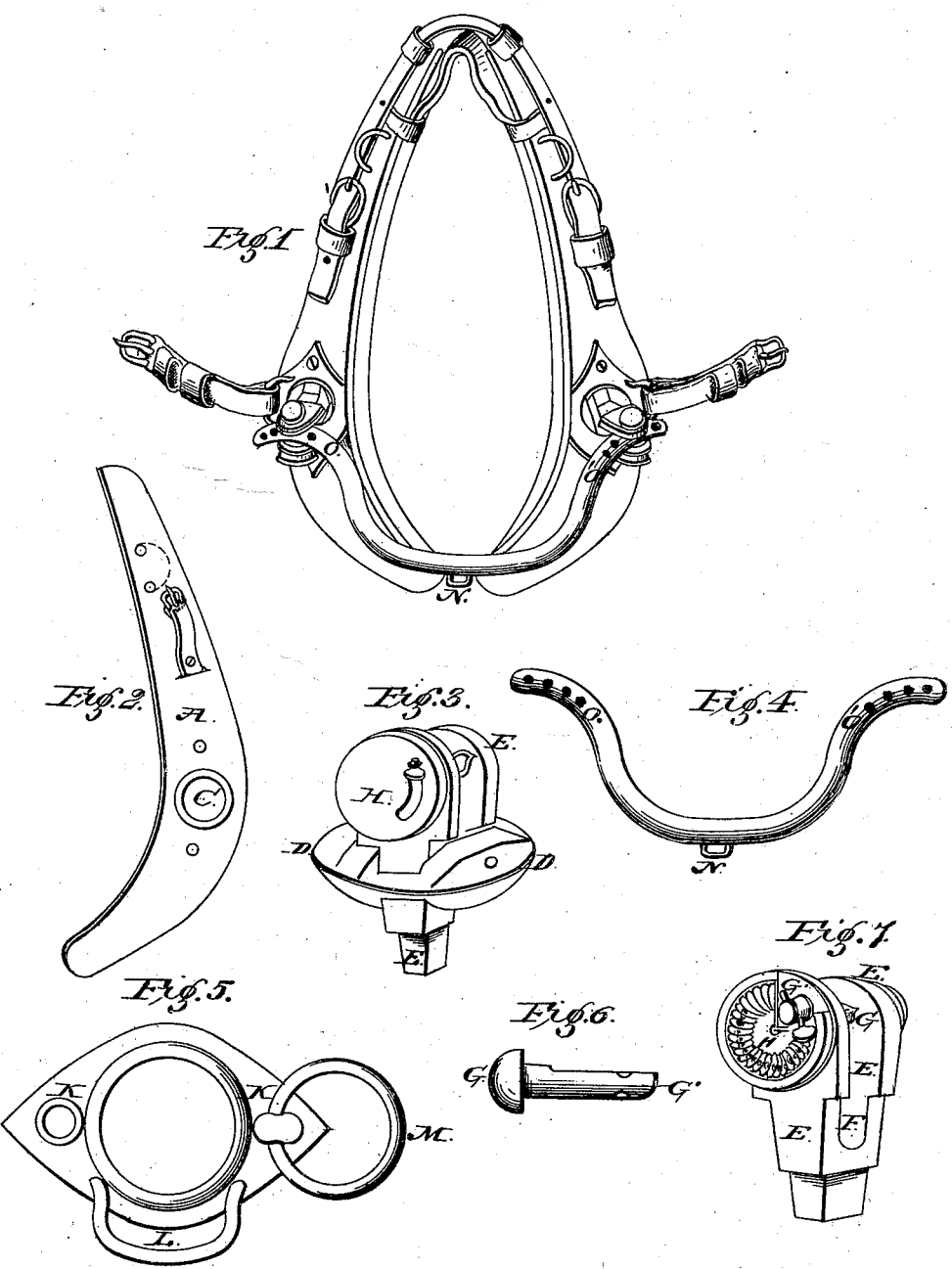

GARRETT VAN WAGENEN, OF MONROE, WISCONSIN, AND MELVIN D. GOBLE, OF DUBUQUE, IOWA.

IMPROVEMENT IN HORSE-COLLARS.

Specification forming part of Letters Patent No. 169,933, dated November 16, 1875; application filed May 14, 1875.

*To all whom it may concern:*

Be it known that we, GARRETT VAN WAGENEN, of Monroe, in the county of Greene and State of Wisconsin, and MELVIN D. GOBLE, of the city and county of Dubuque and State of Iowa, have invented a new, useful, and Improved Horse-Collar; and do hereby declare that the following is a full, clear, and explicit description thereof, reference being had to the accompanying drawings, making part of this specification.

Figure 1 represents the collar closed or united, and as applied to the horse. Fig. 2 represents the collar-frame. Fig. 3 represents the double convex circular disk, with the curved or U part. Fig. 4 represents the curved bar. Fig. 5 represents the plate. Fig. 7 represents the curved or U part and bolt, the latter being separately represented in Fig. 6.

This collar is intended to remove, among others, the following objections to the ordinary collar with hames:

When the hames are buckled down on the collar the latter becomes perfectly unyielding, and incapable of being adjusted to the neck and shoulders of the horse when in motion or drawing. All the muscles of the horse which in their action come in contact with the collar meet in resistance a surface perfectly immovable, except as a whole, which brings the entire weight of draft upon whichever part is most prominent at the instant, and the point of impingement. This creates shoulder-sprain, short stepping, stiffening, &c., and prevents free action, and the exercise of full draft-power.

This invention, from its construction and action, possesses such adaptability that, whatever position the horse takes in doing his work, the resistance to be overcome is equally distributed along the entire length of the shoulder. It adjusts itself to every movement of the shoulder and muscles, so as to permit perfectly free action thereof, and to bring no undue or unequal strain upon any one point. This is accomplished by having the collar made in two pieces over a metallic frame, of a thickness and strength to correspond with the character of use to which it is to be applied. These parts are joined at the top in the manner similar to the ordinary collar, with pads and straps. The lower ends are separate.

The metallic frame A, Fig. 2, is curved, and shaped so as to fit a horse's neck and shoulders, and at the point C is a hole, rimmed on the upper side, upon and over which the joint, hereafter described, is placed. This hole is placed at the point where it will be most advantageous to attach the traces or draft-connections. In this hole is fitted a metallic double-convex disk, D, Fig. 3, having an oblong perforation in the center. Within this perforation is fitted the curved part of the U, E, Figs. 3 and 7, with a projection from the curved part which passes through the perforation in the disk D, and also through the hole C in the frame A. This U is attached to the disk D by a bolt, which passes through the inner part of the curve from the upper part of the disk, the latter being raised sufficiently on each side of the oblong perforation for that purpose. The disks with the U attached are held in their places by a plate, K, Fig. 5, which is fastened to the collar and frame A immediately over the hole C. Through the center of this plate is a circular opening sufficiently large to permit free motion of the arms of the U, which pass through the same. To the plate K are attached staples, rings, or other means for the attachment of traces and pole-straps. Through the ends or arms of the U passes a bolt, G G', Fig. 6, held in its place by a spring-bolt, H, Figs. 3 and 7, which passes through the lower end. The bolt G G' is adjusted to the proper position for the spring-bolt by an oblong projection (seen in Fig. 6) immediately beneath the head of the bolt, which fits into a corresponding slot in perforation of the upper arm of the U. The bolt G G' passes through the end of a curved inflexible bar, O O', Figs. 1 and 4, in which are a number of holes, by means of which the collar may be adjusted so as to perfectly fit the horse's neck and shoulders, and also to which may be attached pole-straps and martingales, or either, at the middle N, Figs. 1 and 4.

The parts above described, when united as above shown, produce a joint in which the double-convex disk gives a circular motion, the U a vertical motion, and the curved bar a lateral motion, while the whole combination is capable of free oscillatory and ball-and-socket motions.

To put on or take off the collar, it is but necessary to attach or detach one end of the bar O O'.

The parts exposed may be plaited or plain, as may suit taste and character of use.

The under side of the frame is to be padded in a manner similar to the ordinary collar.

What we claim, and desire to secure by Letters Patent, is—

1. The combination of the U with the disk D and plate K, substantially as and for the purpose set forth.

2. The combination of the U, the disk B, the plate K, and the frames A A', with the curved bar O O', substantially as and for the purpose set forth.

Witness our hands in the matter of our application for a patent for an improved horse-collar.

GARRETT VAN WAGENEN.
MELVIN D. GOBLE.

Witnesses:
 M. H. BEACH,
 LOUIS G. HURD.